US008213294B2

(12) United States Patent
Arndt et al.

(10) Patent No.: US 8,213,294 B2
(45) Date of Patent: Jul. 3, 2012

(54) MECHANISM FOR DETECTING AND CLEARING I/O FABRIC LOCKUP CONDITIONS FOR ERROR RECOVERY

(75) Inventors: Richard Louis Arndt, Austin, TX (US); Thomas Schlipf, Baden-Wurttemberg (DE); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1556 days.

(21) Appl. No.: 11/426,592

(22) Filed: Jun. 27, 2006

(65) Prior Publication Data

US 2007/0297434 A1 Dec. 27, 2007

(51) Int. Cl.
*G01R 31/08* (2006.01)

(52) U.S. Cl. ........................................ 370/216; 370/412
(58) Field of Classification Search .................. 370/229, 370/230–236, 389, 412, 413, 216; 709/226, 709/234, 236
See application file for complete search history.

(56) References Cited

U.S. PATENT DOCUMENTS

| | | | | | |
|---|---|---|---|---|---|
| 3,936,807 | A | * | 2/1976 | Edwards | 710/72 |
| 5,043,981 | A | * | 8/1991 | Firoozmand et al. | 370/235 |
| 5,119,374 | A | * | 6/1992 | Firoozmand et al. | 370/455 |
| 5,136,582 | A | * | 8/1992 | Firoozmand | 370/400 |
| 5,537,402 | A | * | 7/1996 | Notani et al. | 370/395.7 |
| 5,870,396 | A | * | 2/1999 | Abu-Amara et al. | 370/413 |
| 6,078,595 | A | * | 6/2000 | Jones et al. | 370/503 |
| 6,128,654 | A | * | 10/2000 | Runaldue et al. | 709/219 |
| 6,285,679 | B1 | * | 9/2001 | Dally et al. | 370/413 |
| 6,408,351 | B1 | * | 6/2002 | Hamdi et al. | 710/63 |
| 6,477,610 | B1 | * | 11/2002 | Willenborg | 710/310 |
| 7,251,219 | B2 | * | 7/2007 | Lakshmanamurthy et al. | 370/236 |
| 7,461,236 | B1 | * | 12/2008 | Wentzlaff | 712/10 |
| 7,536,473 | B2 | * | 5/2009 | Ajanovic et al. | 709/234 |
| 2001/0038634 | A1 | * | 11/2001 | Dally et al. | 370/412 |
| 2002/0091887 | A1 | * | 7/2002 | Reay et al. | 710/300 |
| 2002/0097743 | A1 | * | 7/2002 | Baydar et al. | 370/463 |
| 2002/0172195 | A1 | * | 11/2002 | Pekkala et al. | 370/360 |
| 2003/0007513 | A1 | * | 1/2003 | Barker et al. | 370/476 |
| 2003/0142676 | A1 | * | 7/2003 | Zeisz et al. | 370/395.1 |
| 2004/0057202 | A1 | * | 3/2004 | Rabinovitz | 361/685 |
| 2005/0030893 | A1 | | 2/2005 | Dropps et al. | |
| 2005/0030963 | A1 | * | 2/2005 | Solomon et al. | 370/428 |
| 2005/0076113 | A1 | | 4/2005 | Klotz et al. | |
| 2005/0102437 | A1 | * | 5/2005 | Pettey et al. | 710/1 |
| 2005/0147117 | A1 | | 7/2005 | Pettey et al. | |
| 2005/0163044 | A1 | * | 7/2005 | Haq et al. | 370/219 |

(Continued)

FOREIGN PATENT DOCUMENTS

| | | | |
|---|---|---|---|
| JP | 5197669 A | 8/1993 | |
| JP | 6227100 A | 8/1994 | |
| JP | 8320836 A | 12/1996 | |

(Continued)

*Primary Examiner* — Dang Ton
*Assistant Examiner* — Kevin Lee
(74) *Attorney, Agent, or Firm* — Yee & Associates, P.C.; Libby Z. Toub

(57) ABSTRACT

A computer implemented method, apparatus and mechanism for recovery of an I/O fabric that has become terminally congested or deadlocked due to a failure which causes buffers/queues to fill and thereby causes the root complexes to lose access to their I/O subsystems. Upon detection of a terminally congested or deadlocked transmit queue, access to such queue by other root complexes is suspended while each item in the queue is examined and processed accordingly. Store requests and DMA read reply packets in the queue are discarded, and load requests in the queue are processed by returning a special completion package. Access to the queue by the root complexes is then resumed.

16 Claims, 6 Drawing Sheets

U.S. PATENT DOCUMENTS

2005/0265430 A1* 12/2005 Ozluturk et al. .............. 375/145
2006/0209863 A1* 9/2006 Arndt et al. .................... 370/412
2007/0104124 A1* 5/2007 Lee et al. ...................... 370/311
2008/0063004 A1* 3/2008 Himberger et al. ........... 370/413

FOREIGN PATENT DOCUMENTS

| JP | 10107853 A | 4/1998 |
| JP | 2005293283 A | 10/2005 |

* cited by examiner

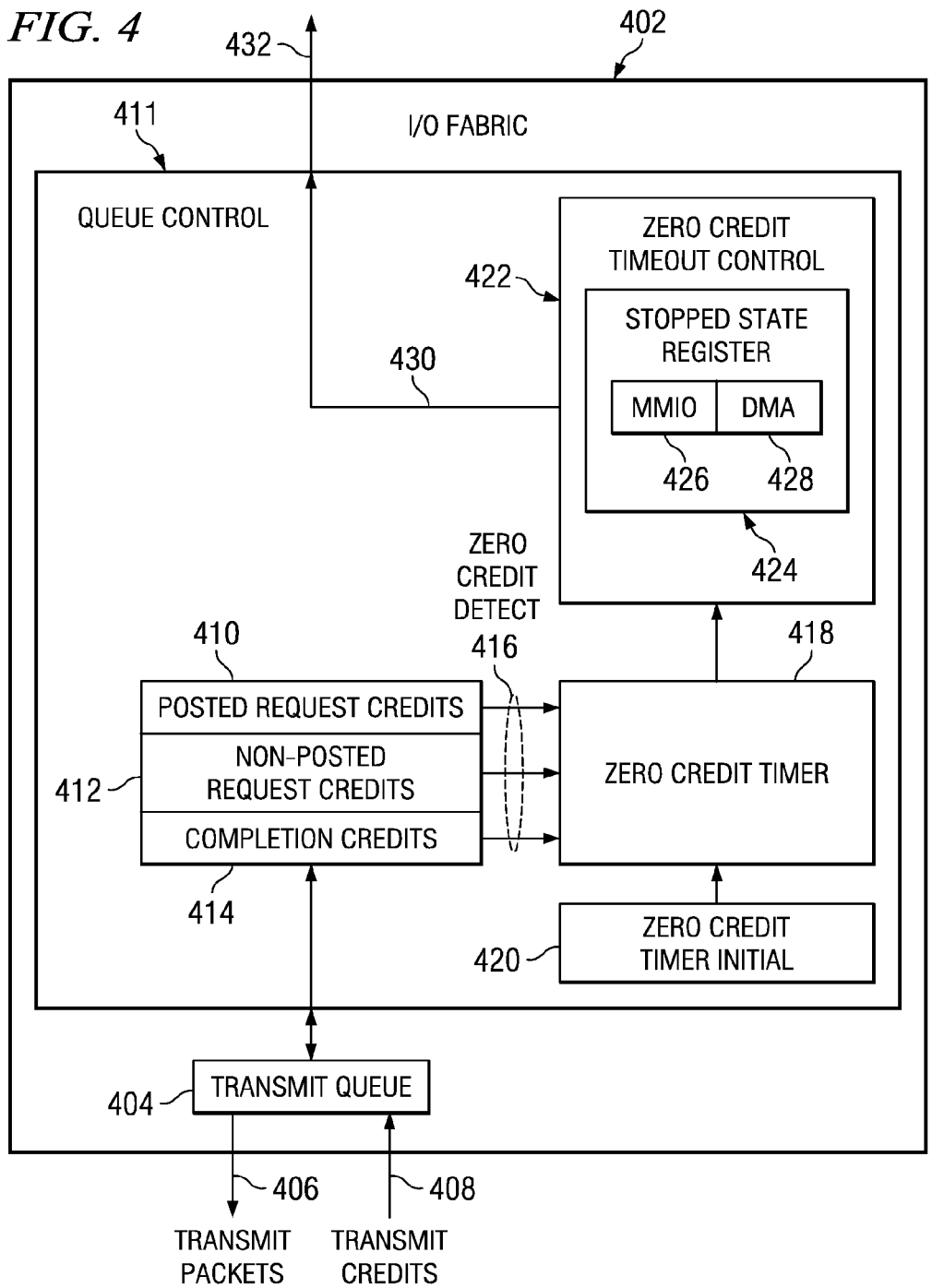

MECHANISM FOR DETECTING AND CLEARING I/O FABRIC LOCKUP CONDITIONS FOR ERROR RECOVERY

BACKGROUND OF THE INVENTION

1. Field of the Invention

The present invention relates generally to communication between a host computer and an input/output (I/O) Adapter through an I/O fabric. More specifically, the present invention addresses the case where the I/O fabric becomes congested or deadlocked because of a failure in a point in the fabric. In particular, the present invention relates to PCI Express protocol where a point in the PCI Express fabric fails to return credits, such that the fabric becomes locked up or deadlocked and can no longer move I/O operations through it.

2. Description of the Related Art

The PCI Express specification (as defined by PCI-SIG of Beaverton, Oreg.) details the link behavior where credits are given to the other end of the link which relate to empty buffers. Should the other end of the link fail to return credits, for example, due to the buffers never being cleared, then due to the ordering requirements on operations, the buffers can fill up in all the components up to the root complexes, making it impossible for the root complexes to access their I/O subsystems. The PCI Express specification does not detail what is expected of the hardware in this situation. It is expected in such situations that the fabric and the root complex or complexes attached to that fabric will need to be powered down and back up again to clear the error.

The illustrative embodiments detail a computer implemented method and mechanism that allows an I/O fabric to be recovered without powering down the fabric or any root complexes attached to the fabric. In particular, the illustrative embodiments relate to the PCI Express I/O fabric, but those skilled in the art will recognize that this can be applied to other similar I/O fabrics.

SUMMARY OF THE INVENTION

A computer implemented method and mechanism is provided for recovery of an I/O fabric that has become terminally congested or deadlocked due to a failure which causes buffers/queues to fill and thereby causes the root complexes to lose access to their I/O subsystems. Upon detection of a terminally congested or deadlocked transmit queue, access to such queue by other root complexes is suspended while each item in the queue is examined and processed accordingly. Store requests and DMA read reply packets in the queue are discarded, and load requests in the queue are processed by returning a special completion package. Access to the queue by the root complexes is then resumed.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

FIG. 4 shows the queue control in which the exemplary aspects are embodied;

DETAILED DESCRIPTION OF THE PREFERRED EMBODIMENT

The illustrative embodiments, as described herein, applies to any general or special purpose computing system where an I/O fabric uses messages such as credits to advertise resource availability on the other end of a link. More specifically, the preferred embodiment described herein below provides an implementation using PCI Express I/O links.

Figure 1:
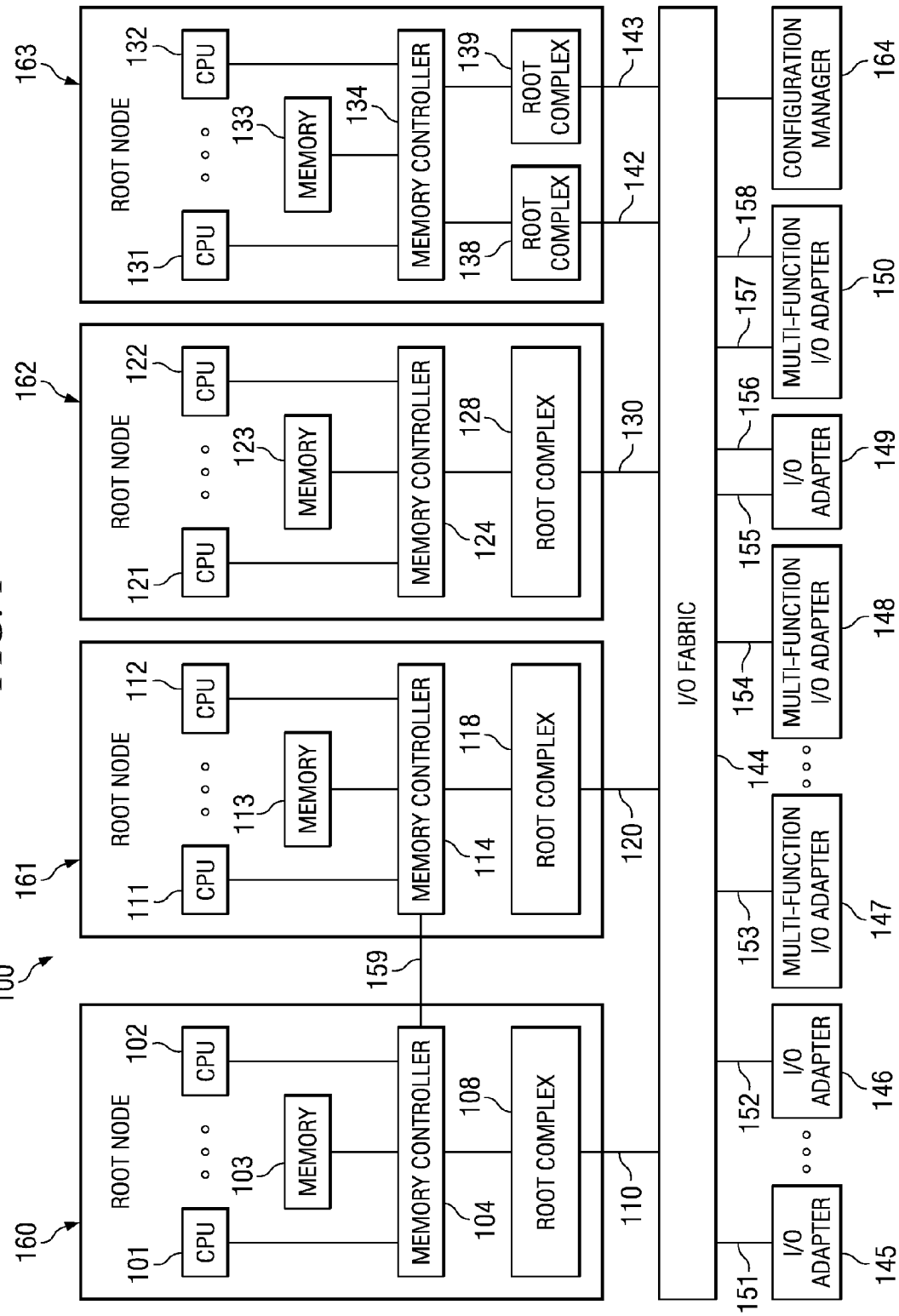
FIG. 1 is a diagram of a distributed computer system depicted in accordance with the illustrative embodiments.

With reference now to the figures and in particular with reference to FIG. 1, a diagram of a distributed computing system 100 is depicted in accordance with the illustrative embodiments. The distributed computing system represented in FIG. 1 takes the form of one or more root complexes (RCs) 108, 118, 128, 138, and 139 attached to I/O fabric 144 through I/O links 110, 120, 130, 142, and 143 and to memory controllers 104, 114, 124, and 134 of root nodes (RNs) 160-163. The I/O fabric is attached to I/O adapters (IOAs) 145-150 through links 151-158. The IOAs may be single function IOAs as in 145-146 and 149 or multiple function IOAs as in 147-148 and 150. Further, the IOAs may be connected to the I/O fabric via single links as in 145-148 or with multiple links for redundancy as in 149-150.

Each one of the RCs 108, 118, 128, 138, and 139 are part of a respective RN 160-163. There may be more than one RC per RN as in RN 163. In addition to the RCs, each RN consists of one or more central processing units (CPUs) 101-102, 111-112, 121-122, 131-132, memory 103, 113, 123, and 133 and memory controller 104, 114, 124, and 134 which connects the CPUs, memory, and I/O RCs and performs such functions as handling the coherency traffic for the memory.

Multiple RNs may be connected together at 159 via their respective memory controllers 104 and 114 to form one coherency domain and which may act as a single symmetric multi-processing (SMP) system, or may be independent nodes with separate coherency domains as in RNs 162-163.

Configuration manager 164 may be attached separately to I/O fabric 144 (as shown in FIG. 1) or may be part of one of RNs 160-163. The configuration manager configures the shared resources of the I/O fabric and assigns resources to the RNs.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

Figure 2:
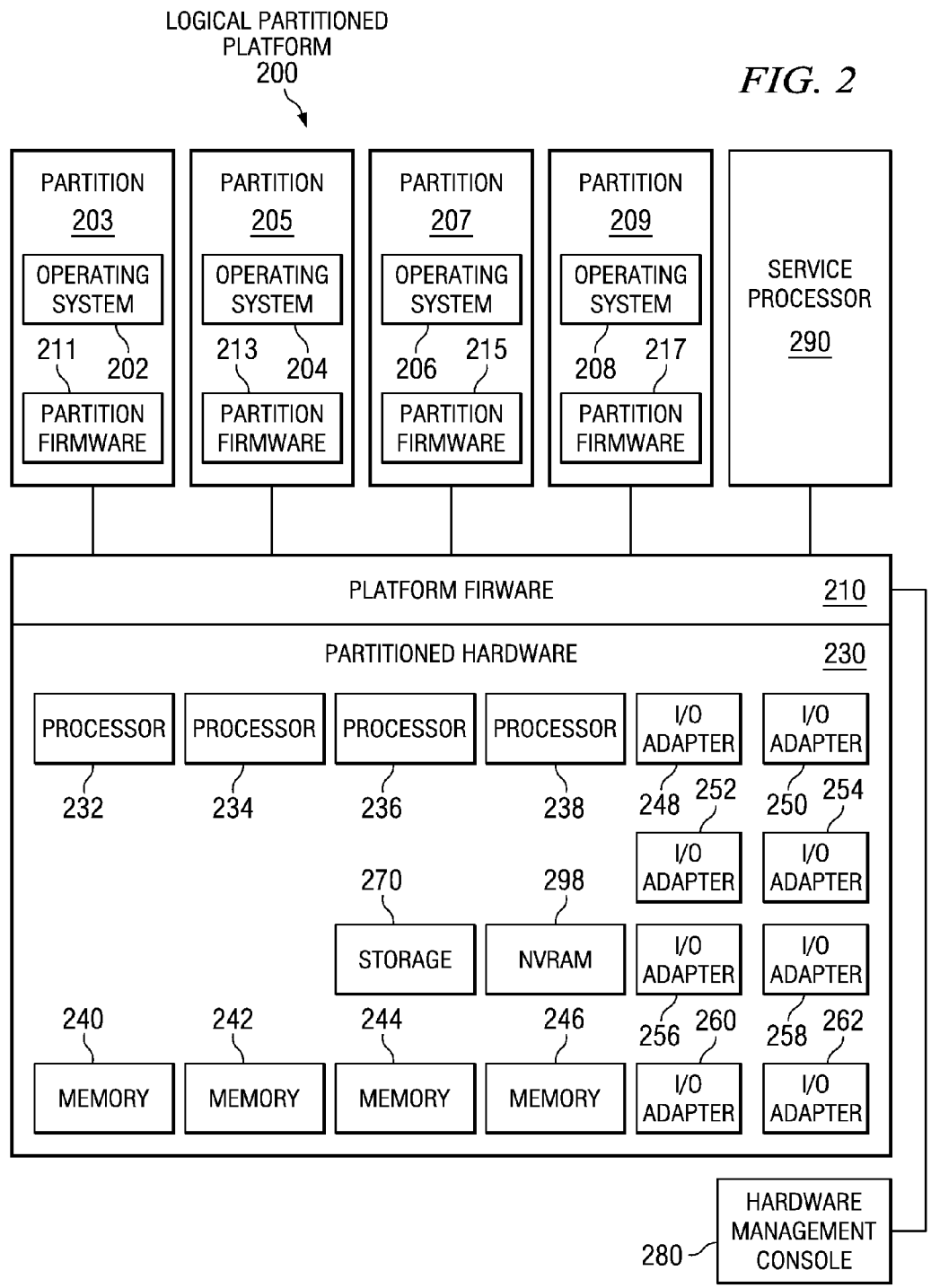
FIG. 2 is a block diagram of an exemplary logical partitioned platform in which the illustrative embodiments may be implemented.

With reference now to FIG. 2, a block diagram of an exemplary logical partitioned platform is depicted in which the illustrative embodiments may be implemented. The hardware in logical partitioned platform 200 may be implemented as, for example, distributed computing system 100 in FIG. 1. Logical partitioned platform 200 includes partitioned hardware 230, operating systems (OS) 202, 204, 206, 208, and platform firmware 210. Operating systems 202, 204, 206, and 208 may be multiple copies of a single operating system or multiple heterogeneous operating systems simultaneously run on logical partitioned platform 200. These operating systems may be implemented using an OS/400® operating system, which are designed to interface with a platform or partition management firmware, such as Hypervisor. The OS/400 operating system is used only as an example in these illustrative embodiments. Other types of operating systems, such as AIX® and Linux® operating systems, may also be used depending on the particular implementation (AIX is a registered trademark of International Business Machines Corporation in the U.S. and other countries, and Linux is a trademark of is a registered trademark of Linus Torvalds in the U.S. and other countries). Operating systems 202, 204, 206, and 208 are located in partitions 203, 205, 207, and 209, respectively. Hypervisor software is an example of software that may be used to implement platform firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 standard open firmware and runtime abstraction software (RTAS), which are available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, NVRAM storage 298, and storage unit 270. Each of processors 232-238, memory units 240-246, NVRAM storage 298, and IOAs 248-262, or parts thereof, may be assigned to one of multiple partitions within logical partitioned platform 200, each of which corresponds to one of operating systems 202, 204, 206, and 208.

Platform firmware 210 performs a number of functions and services for partitions 203, 205, 207, and 209 to create and enforce the partitioning of logical partitioned platform 200. Platform firmware 210 is a firmware-implemented virtual machine identical to the underlying hardware. Thus, platform firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate distributed computing system from which a system administrator may perform various functions including reallocation of resources to different partitions.

In a logical partitioning (LPAR) environment, it is not permissible for resources or programs in one partition to affect operations in another partition. Furthermore, to be useful, the assignment of resources needs to be fine-grained. For example, it is often not acceptable to assign all IOAs under a particular PCI host bridge (PHB) to the same partition, as that will restrict configurability of the system, including the ability to dynamically move resources between partitions. Accordingly, some functionality is needed in the I/O fabric and root complexes that connect IOAs to the root nodes so as to be able to assign resources, such as individual IOAs or parts of IOAs to separate partitions; and, at the same time, prevent the assigned resources from affecting other partitions such as by obtaining access to resources of the other partitions.

Figure 3:
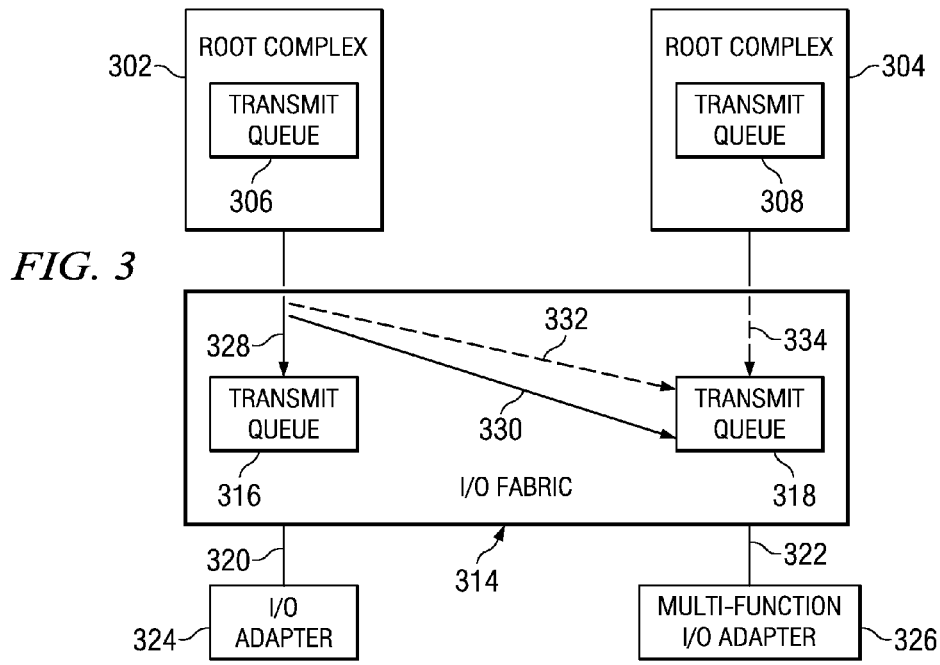
FIG. 3 is a high-level diagram showing the communications between one root complex and several I/O adapters and several root complexes and one I/O adapter, in which buffer blockages will be resolved in accordance with the illustrative embodiments.

FIG. 3 shows two RCs 302-304, each with its own transmit queue 306 and 308, which is used to transmit I/O packets onto I/O fabric 314. RC 302 is shown to be communicating to I/O adapters 324 and 326 at solid lines 328 and 330 and dotted line 332 (the solid lines indicating an initial set of communications, and the dotted line indicating a subsequent communication); and RC 304 is shown to be communicating to I/O adapter 326 at dotted line 334. If I/O adapter 324 stops receiving packets from transmit queue 316 (that is, it stops giving credits back to the control logic for transmit queue 316), then transmit queue 316 can fill, causing transmit queue 306 to fill and prevent communication 330 to I/O adapter 326. Thus, a breakage of I/O adapter 324 can make I/O adapter 326 useless, too, to RC 302.

Likewise, if I/O adapter 326 stops receiving packets from transmit queue 318 (that is, it stops giving credits back to the control logic for transmit queue 318), then transmit queue 318 can fill, causing transmit queue 306 and 308 to fill and prevent communications such as 332 and 334 from all RCs communicating with that I/O adapter. Thus, a breakage of I/O adapter 326 can lockup the I/O fabrics from all RCs communicating to that I/O adapter, and I/O operations to other I/O adapters can be affected, too. It is this breakage that these illustrative embodiments intend to prevent.

FIG. 4 shows the queue control logic 411 which controls transmit queue 404. Transmitting of packets 406 from transmit queue 404 depends on the other end of the link returning transmit credits 408, such as by I/O adapter 324 or 326 of FIG. 3. Those credits are tracked by posted request credit register 410, non-posted request credit register 412, and completion credits register 414. If any of these three registers goes to zero, as detected at 416, zero credit timer 418 is loaded with an initial value stored in zero credit timer initial register 420 and then continues to count down for as long as one of registers 410-414 is zero. If all of registers 410-414 become non-zero, then zero credit timer 418 stops counting. Zero credit timer initial register 420 can either be a fixed value or can be programmable via the system firmware or software, with programmable being the preferred embodiment.

When the zero credit timer counts down to zero, this indicates that there has been a lockup condition detected, and which needs to be cleared. Namely, when the zero credit timer counts to zero, this sets memory-mapped I/O (MMIO) bit 426 and direct memory access (DMA) bit 428 in stopped state register 424 in zero credit timeout control logic 422. When this occurs, all affected root complexes are signaled with an error message, for example error message 430 is signaled on one of the primary buses 432 of I/O fabric 402. In addition, the lockup is cleared, as will be detailed later.

Figure 5:
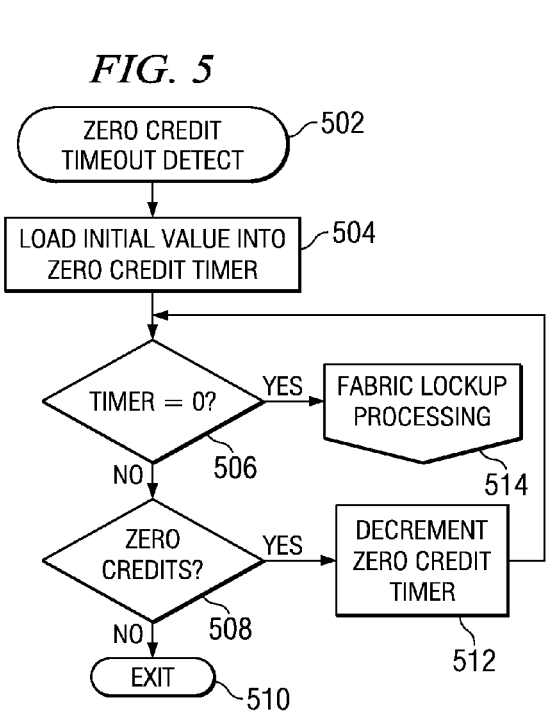
FIG. 5 is a flowchart showing how the lockup condition is detected in accordance with the illustrative embodiments.

FIG. 5 shows the flow of the processing by the hardware when a zero credit timeout is detected. The flow starts with 502 with the detection of the error. At 504, the initial value for counting is loaded into the zero credit timer from the zero credit timer initial register. At 506, the zero credit timer is checked to see if it is zero, and if it is not, then processing continues to 508 where the determination is made as to whether the zero credit condition still exists. If not, then the process exits at 510. If the zero credit condition still exists at 508, then the zero credit timer register is decremented at 512 and then checked again for zero at 506. If the zero credit timer register goes to zero, then the fabric lockup processing is started at 514.

Figure 6:
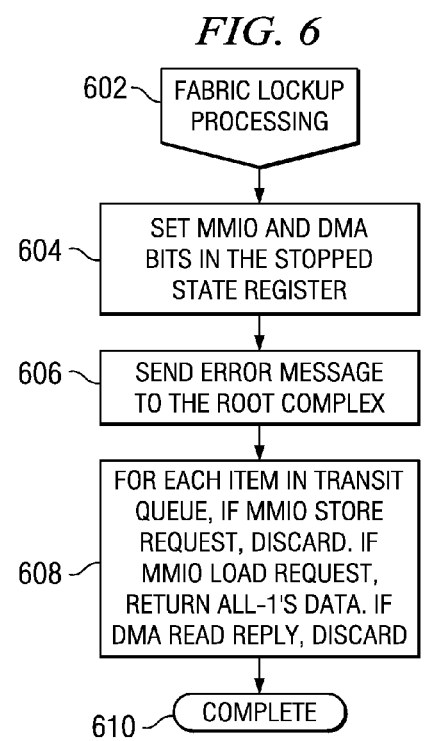
FIG. 6 is a flowchart showing the fabric lockup processing by the hardware in accordance with the illustrative embodiments.

FIG. 6 indicates the fabric lockup processing, which starts at 602. The MMIO and DMA bits in the stopped state register are set by hardware at 604. The hardware then sends an error message to the root complexes 606, so that they can start error processing. The last step 608 in the lockup processing is to clear the transmit queue that has detected the problem. To do this, each item in the transmit queue is examined and processed appropriately: MMIO store requests are discarded; MMIO load requests are processed by returning a completion packet with the data forced to all-1's (e.g. all bits in the packet are set to a binary '1' value); and DMA read reply packets are discarded. By doing this, the transmit queue is temporarily cleared and processing of entries is complete at 610. However, there may be transactions upstream that are causing fabric congestions, and those will flow down to the transmit queue, so processing continues if this happens, as shown in FIG. 7.

Figure 7:
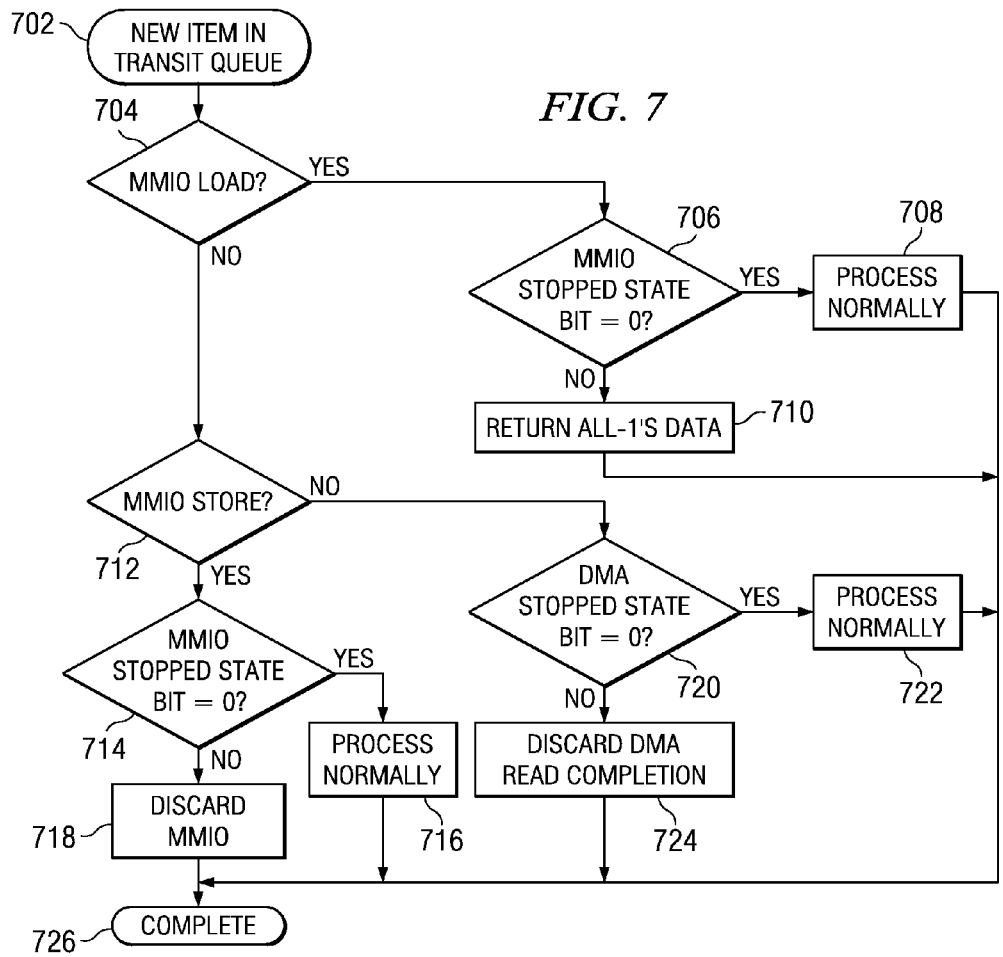
FIG. 7 is a flowchart showing how the hardware prevents the fabric from becoming locked up again, pending firmware or software processing of the error in accordance with the illustrative embodiments.

In FIG. 7, the processing of new entries is shown. The purpose of setting the MMIO and DMA bits in the stopped state register (as per step 604 of FIG. 6) is to keep the transmit queue cleared until software can begin processing the error and bring everything to a controlled state. This is shown as follows. The new item is received 702 and a determination is made as to whether it is an MMIO load operation 704. If it is, and the MMIO bit is a 0 as determined at 706, then the MMIO load operation is processed normally at 708 and the operation is complete at 726. If the MMIO bit is set to a 1 at 706, then all-1's data is returned for the load at 710 and the operation is complete at 726. The all-1's data can then signal the operating system, device driver, or other software to examine the I/O subsystem to see if an error has occurred.

If this is not an MMIO load operation as determined at 704, then the operation is checked for an MMIO store operation at 712. If it is, and the MMIO bit is a 0 as determined at 714, then the MMIO store operation is processed normally at 716, and the operation is complete at 726. If the MMIO bit is set to a 1 at 714, then the store is discarded at 718 and the operation is complete at 726.

If this is not an MMIO operation as determined at 704 or 712, then it must be a DMA read reply operation. In this case, the DMA bit in the stopped state register is checked at 720, and if a 0, then the DMA operation is processed normally at 722, and the operation is complete at 726. Finally, if the determination is made at 720 that the DMA bit is a 1, then the DMA read completion is discarded at 724, and the operation is complete at 726.

Figure 8:
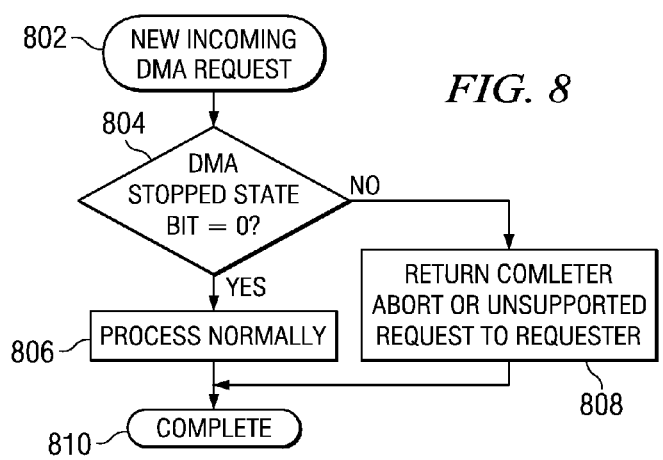
FIG. 8 is a flowchart showing DMA processing while the I/O fabric is in the process of being recovered in accordance with the illustrative embodiments.

If during the time that the DMA bit is set, and there is a new DMA request that comes in, it needs to be processed appropriately. FIG. 8 shows how this is done. The new DMA request is received at 802 and a determination is made at 804 as to whether the DMA bit is a 0 in the stopped state register 804. If it is, then the DMA is processed normally at 806 and the operation is complete at 810.

If the DMA bit is not a 0 at 804, then the hardware returns a completer abort or unsupported request to the requester 808 and the operation is complete at 810.

Figure 9:
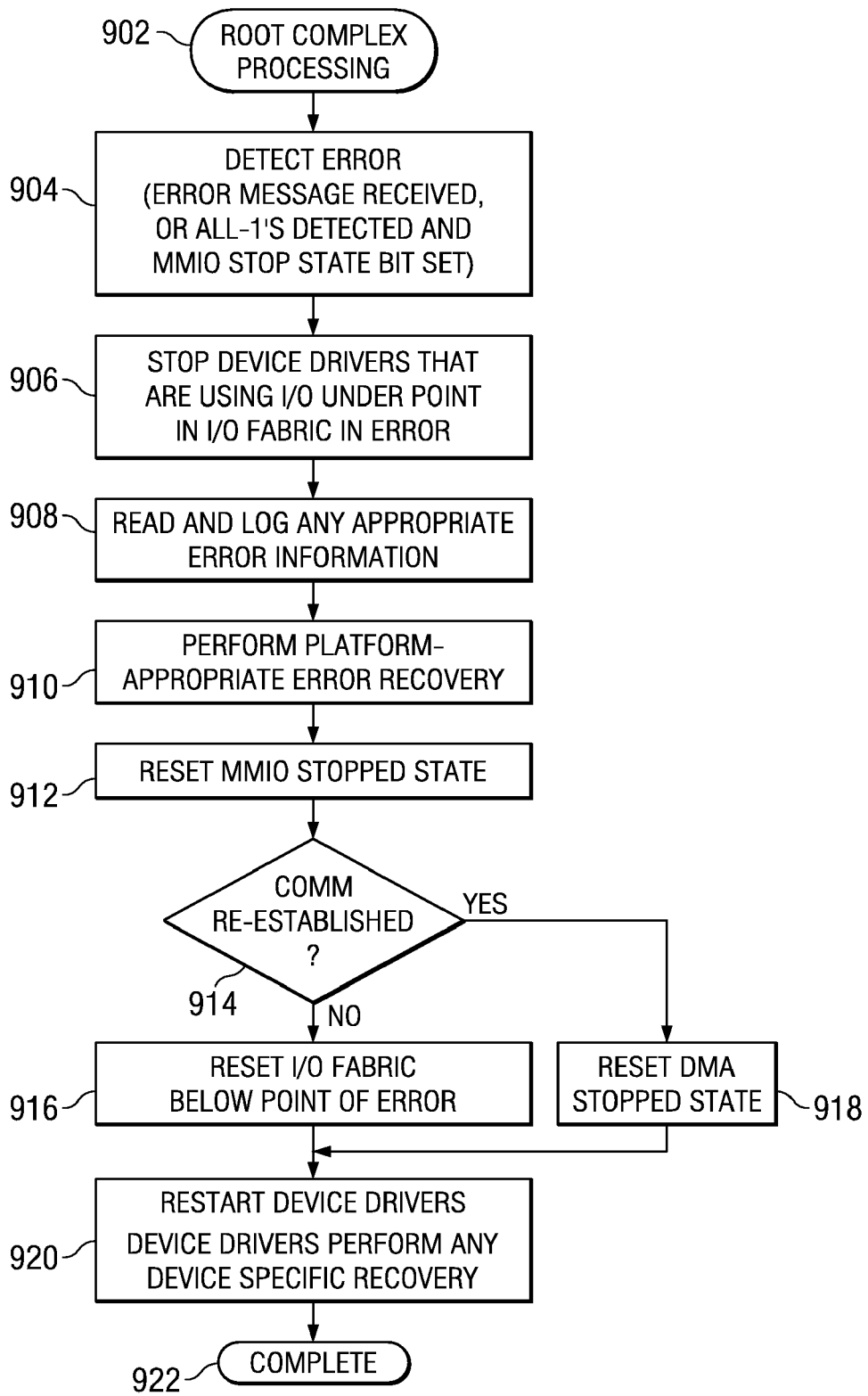
FIG. 9 is the high-level flow of root complex processing of the fabric lockup errors in accordance with the illustrative embodiments.

The processing of fabric errors at the RC is somewhat platform dependent, but FIG. 9 indicates the general flow. The processing begins at 902 and error is detected with the detection of the error message that was sent or because an all-1's data was unexpectedly received at 904. The operating system or the RC hardware stops the device drivers from issuing any further operations to the I/O below the point in the I/O fabric from which the error was detected at 906. For example, referring to FIG. 3, I/O adapter 324 is under transmit queue 316 (the point of error in this example), and the RC hardware stops the device drivers from issuing any further operations to this I/O adapter 324 if this point 316 is detected to be in error or deadlocked. Similarly, I/O adapter 326 is under transmit queue 318 (the point of error in this example), and the RC hardware stops the device drivers from issuing any further operations to this I/O adapter 326 if this point 318 is detected to be in error or deadlocked. The software or firmware then reads out any error information from the fabric and logs that information for possible future evaluation 908. The platform then performs any platform-specific error recovery at 910 and the MMIO bit in the stopped state register is cleared at 912, so that MMIO operation below that point can continue, if possible, at 912. At 914, a determination is made as to whether or not the communications can be continued, and if so, then the DMA bit is reset at 918. The device drivers are restarted and any device-specific error recovery is performed at 920. The recovery is complete at 922. If the determination is made at 914 that the communication below the point of failure cannot be re-established, then the I/O fabric below the point of failure is reset at 916, the device drivers are restarted and any device-specific error recovery is performed at 920. The recovery is complete at 922.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The computer-readable medium can be an electronic, magnetic, optical, or semiconductor system (or apparatus or device) storage medium, or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for clearing a queue in an input/output (I/O) fabric coupled between (i) a plurality of data processing nodes each having at least one central processing unit (CPU) and a memory and (ii) a plurality of I/O adapters, comprising steps of:
    detecting that the queue in the I/O fabric is deadlocked;
    disabling access to the queue in the I/O fabric by the plurality of data processing nodes;
    clearing entries in the queue in the I/O fabric; and
    responsive to clearing the entries in the queue in the I/O fabric, re-enabling access to the queue in the I/O fabric by the plurality of data processing nodes, wherein the I/O fabric facilitates data communication between the plurality of data processing nodes and a plurality of I/O adapters by forwarding direct memory access commands to at least one of the plurality of I/O adapters that the I/O fabric receives from at least one of the plurality of data processing nodes, wherein disabling access to the queue comprises temporarily disregarding direct memory access commands received from the plurality of data processing nodes, and wherein clearing entries in the queue comprises discarding direct memory access commands stored at the queue.

2. The method of claim 1, where the queue is detected as being deadlocked when the queue no longer receives a credit from a next layer in the I/O fabric that is below the queue within a given period of time as determined by queue control logic associated with the queue.

3. The method of claim 2, wherein the next layer in the I/O fabric is an I/O adapter coupled to the queue, and the at least one of the plurality of data processing nodes communicates with the I/O adapter by sending direct memory access commands to the I/O adapter using the I/O fabric.

4. The method of claim 1 where the step of detecting that the queue is deadlocked comprises:
    maintaining a count of at least one credit;
    determining whether the count of any one of the at least one credit is zero, and if so, starting a timer; and
    upon expiration of a time period as determined by the timer, the queue is detected as being deadlocked.

5. The method of claim 4, where the step of maintaining the count of at least one credit comprises:
    maintaining a count of posted request credits;
    maintaining a count of non-posted request credits; and
    maintaining a count of completion credits.

6. The method of claim 5, wherein the timer is loaded with an initial timer value prior to the starting of the timer.

7. The method of claim 6, wherein the timer is programmable.

8. The method of claim 6, wherein another determination is made, after the timer is started, as to whether any one of the posted request credits count, the non-posted request credits count and the completion credits count is zero, and if so, the timer is decremented.

9. The method of claim 1, wherein the I/O fabric is a PCI Express I/O fabric.

10. The method of claim 3, wherein a failure of the I/O adapter causes a failure of another of the plurality of I/O adapters when the queue is detected as being deadlocked, wherein the I/O adapter is a multi-function I/O adapter having a plurality of links coupled to the I/O fabric, and wherein at least two of the plurality of data processing nodes are coupled together via respective memory controllers in each of the at least two of the plurality of data processing nodes to form a coherency domain that acts as a single symmetric multi-processing system.

11. A method for recovering from a deadlock failure of a point in an I/O fabric without powering down the I/O fabric, wherein the I/O fabric is operably coupled between a plurality of data processing systems and a plurality of I/O adapters, wherein each of the plurality of data processing systems comprises a system transmit queue and the I/O fabric comprises a plurality of fabric transmit queues, and wherein the data processing systems utilize the I/O fabric, the plurality of I/O adapters, and direct memory access commands to communicate with a data network that the plurality of I/O adapters are connected to, comprising steps of:
    detecting that a queue in the I/O fabric is deadlocked;
    disabling access to the queue in the I/O fabric by the plurality of data processing systems;
    clearing entries in the queue in the I/O fabric; and
    responsive to clearing the entries in the queue in the I/O fabric, re-enabling access to the queue in the I/O fabric by the plurality of data processing systems, wherein disabling access to the queue comprises temporarily disregarding direct memory access commands received from the plurality of data processing systems, and wherein clearing entries in the queue comprises discarding direct memory access commands stored at the queue.

12. The method of claim 11, wherein the recovering step comprises:
    the I/O fabric disabling access to the point by the data processing systems coupled to the I/O fabric;
    the I/O fabric processing items queued in the point of the I/O fabric to remove the queued items; and
    the I/O fabric re-enabling access to the point by the data processing systems coupled to the I/O fabric.

13. A computer program product comprising a tangible computer usable storage device having stored thereon computer usable program code for processing an error in an I/O fabric, the computer program product including:
 computer usable program code for recovering from a deadlock failure of a point in the I/O fabric without powering down the I/O fabric, wherein the I/O fabric is operably coupled between a plurality of data processing systems and a plurality of I/O adapters, wherein each of the plurality of data processing systems comprises a system transmit queue and the I/O fabric comprises a plurality of fabric transmit queues, and wherein the data processing systems utilize the I/O fabric, the plurality of I/O adapters and direct memory access commands to communicate with a data network that the plurality of I/O adapters are connected to, wherein the computer usable program code is operable, when executed by a data processor, to perform steps of:
 detecting that a queue in the I/O fabric is deadlocked;
 disabling access to the queue in the I/O fabric by the plurality of data processing systems;
 clearing entries in the queue in the I/O fabric; and
 responsive to clearing the entries in the queue in the I/O fabric, re-enabling access to the queue in the I/O fabric by the plurality of data processing systems, wherein disabling access to the queue comprises temporarily disregarding direct memory access commands received from the plurality of data processing systems, and wherein clearing entries in the queue comprises discarding direct memory access commands stored at the queue.

14. A computer program product comprising a tangible computer usable storage device having stored thereon computer usable program code for processing an error in an I/O fabric, the computer program product including:
 computer usable program code for recovering from a deadlock failure of a point in the I/O fabric without powering down the I/O fabric, wherein the computer usable program code for recovering from the deadlock failure comprises:
 computer usable program code for detecting that a queue in the I/O fabric is deadlocked;
 computer usable program code for disabling access to the point by systems coupled to the I/O fabric;
 computer usable program code for processing items queued in the point of the I/O fabric to remove the queued items; and
 computer usable program code for re-enabling access to the point by the systems coupled to the I/O fabric, wherein the I/O fabric facilitates data communication between the systems and a plurality of I/O adapters by forwarding direct memory access commands to at least one of the plurality of I/O adapters that the I/O fabric receives from at least one of the systems, wherein disabling access to the queue comprises temporarily disregarding direct memory access commands received from the systems, and wherein clearing entries in the queue comprises discarding direct memory access commands stored at the queue.

15. The computer program product of claim 14, further comprising:
 computer usable program code for detecting that the point in the I/O fabric is deadlocked;
 computer usable program code for sending an error message to at least one of a plurality of data processing systems; and
 wherein the computer usable program code for processing items queued in the point comprises computer usable program code for examining queued items in the point and selectively returning a completion packet to a sender of a given queued item of the queued items based upon a type of instruction of the given queued item.

16. The computer program product of claim 15, wherein the point is detected as being deadlocked when the point no longer receives a credit from a next layer in the I/O fabric that is below the point within a given period of time; and
 wherein the computer usable program code for disabling access to the point comprises computer usable program code for discarding direct memory access commands received from the at least one of the plurality of data processing systems.

* * * * *